United States Patent
Li et al.

(10) Patent No.: US 12,509,396 B2
(45) Date of Patent: Dec. 30, 2025

(54) USE OF SILANE COMPOSITE EMULSION AS ANTI-CRACKING ENHANCER

(71) Applicant: QINGDAO UNIVERSITY OF TECHNOLOGY, Qingdao (CN)

(72) Inventors: Shaochun Li, Qingdao (CN); Shilin Xu, Qingdao (CN); Ang Liu, Qingdao (CN); Yongjuan Geng, Qingdao (CN); Dongshuai Hou, Qingdao (CN); Ruiyong Zhang, Qingdao (CN); Zuquan Jin, Qingdao (CN); Song Gao, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 18/004,560

(22) PCT Filed: Jul. 27, 2021

(86) PCT No.: PCT/CN2021/108637
§ 371 (c)(1),
(2) Date: Jan. 6, 2023

(87) PCT Pub. No.: WO2023/272846
PCT Pub. Date: Jan. 5, 2023

(65) Prior Publication Data
US 2024/0254047 A1    Aug. 1, 2024

(30) Foreign Application Priority Data

Jun. 28, 2021 (CN) .......................... 202110720454.6

(51) Int. Cl.
| | | |
|---|---|---|
| C01B 33/26 | (2006.01) | |
| C04B 14/04 | (2006.01) | |
| C04B 14/10 | (2006.01) | |
| C04B 18/14 | (2006.01) | |
| C04B 22/06 | (2006.01) | |
| C04B 24/42 | (2006.01) | |
| C04B 28/00 | (2006.01) | |
| C04B 40/00 | (2006.01) | |
| C04B 103/40 | (2006.01) | |
| C04B 111/34 | (2006.01) | |

(52) U.S. Cl.
CPC ............ *C04B 24/42* (2013.01); *C04B 22/066* (2013.01); *C04B 40/0046* (2013.01); *C04B 40/0039* (2013.01); *C04B 2103/408* (2013.01); *C04B 2111/343* (2013.01)

(58) Field of Classification Search
CPC ... C04B 24/42; C04B 22/066; C04B 40/0046; C04B 40/0039; C04B 2103/408; C04B 2111/343; C04B 28/02; C04B 22/06; C04B 40/00; C04B 2111/34; C04B 24/04; C04B 24/32; C04B 2103/40; C04B 24/045; C04B 2103/0068; C04B 24/28; C04B 24/16; C04B 24/2623; Y02W 30/91
See application file for complete search history.

(56) References Cited

U.S. PATENT DOCUMENTS

| 10,259,748 B2 | 4/2019 | Schottler et al. |
| 2017/0327422 A1 | 11/2017 | Schottler et al. |

FOREIGN PATENT DOCUMENTS

| CN | 104230376 | | 12/2014 | | |
| CN | 106634095 A | * | 5/2017 | | |
| CN | 107022080 | | 8/2017 | | |
| CN | 107022080 A | * | 8/2017 | ........... | C04B 41/009 |
| CN | 107652817 A | * | 2/2018 | ........... | C08F 120/14 |
| CN | 110204244 A | * | 9/2019 | ........... | C01B 32/198 |

OTHER PUBLICATIONS

CN-110204244-A, machine translation (Year: 2019).*
CN-107022080-A, machine translation (Year: 2017).*
Gelest. Tetraethoxysilane [retrieved at May 1, 2025 from <URL:https://web.archive.org/web/20200919180748/https://www.gelest.com/product/SIT7110.0/>] (Year: 2020).*
CN-106634095-A, machine translation (Year: 2017).*
CN-107652817-A, machine translation (Year: 2018).*

* cited by examiner

*Primary Examiner* — Amber R Orlando
*Assistant Examiner* — Marites A Guino-O Uzzle
(74) *Attorney, Agent, or Firm* — DLA Piper LLP (US)

(57) ABSTRACT

Provided is the use of a silane composite emulsion as an anti-cracking enhancer in a cement-based material. In the present disclosure, active groups on an isobutyltriethoxysilane molecule react with hydroxyl groups on a surface of a mortar to form a layered hydrophobic structure, slowing down a water loss inside the mortar of a cement-based material. The dehydration of butyl acrylate forms a network structure, which fills pores of the cement-based material, inhibits shrinkage of the cement-based material, and reduces the cracking caused by the shrinkage. Tetraethoxysilane can undergo hydrolysis at a room temperature to generate nano-silica with a large number of hydroxyl groups on a surface; and the nano-silica can undergo secondary hydration with calcium hydroxide in the cement to form a secondary hydration product C—S—H gel, thereby filling most of voids to make a structure of the cement hydration product denser, to increase a strength of the mortar.

13 Claims, 10 Drawing Sheets

USE OF SILANE COMPOSITE EMULSION AS ANTI-CRACKING ENHANCER

CROSS REFERENCE TO RELATED APPLICATION

The present application claims priority to the Chinese Patent Application No. 202110720454.6, filed with the China National Intellectual Property Administration (CNIPA) on Jun. 28, 2021, and entitled "USE OF SILANE COMPOSITE EMULSION AS ANTI-CRACKING ENHANCER", which is incorporated herein by reference in its entirety.

TECHNICAL FIELD

The present disclosure relates to the technical field of cement-based materials, in particular to use of a silane composite emulsion as an anti-cracking enhancer in a cement-based material.

BACKGROUND

Concrete is a typical cement-based material widely used in roads, bridges, and dams and other projects due to easy availability and relatively-low price. However, during the solidification and hardening, the cracking caused by concrete shrinkage has always been unavoidable. For ordinary concrete, drying shrinkage is a main factor causing concrete cracking, accounting for about 80% to 90% of the total shrinkage. Drying shrinkage is caused by the rapid loss of internal water due to a fact that the concrete has a relative humidity inside higher than that of the outside environment. With the water loss, a water level inside capillary tubes in the material drops, and the meniscus has an increased curvature, resulting in an increase in surface tension to produce pressures on the capillary wall; the capillary tubes continue to lose water, and the concrete continues to be under an increasing pressure. As a result, the drying shrinkage of a concrete volume appears to adversely affect a service life of the building.

Silane materials (such as isobutyltriethoxysilane) are excellent concrete waterproofing materials that can inhibit the water loss of concrete. Butyl acrylate can also be dehydrated during cement hydration to form network polymer fibers to fill pores, thus limiting the shrinkage of the mortar. However, film formation of the above two materials may affect a cement hydration rate, resulting in a decrease in the strength of a cement matrix.

SUMMARY

In view of this, an objective of the present disclosure is to provide use of a silane composite emulsion as an anti-cracking enhancer in a cement-based material. In the present disclosure, the silane composite emulsion is used as an anti-cracking enhancer of a cement-based material, which can improve a strength of the cement-based material while suppressing cracking of the cement-based material.

To achieve the above objective of the present disclosure, the present disclosure provides the following technical solutions.

The present disclosure provides use of a silane composite emulsion as an anti-cracking enhancer in a cement-based material.

Preferably, the silane composite emulsion includes tetraethoxysilane, isobutyltriethoxysilane, butyl acrylate, magnesium oxide, an emulsifier, a dispersant, and water.

Preferably, the emulsifier includes a first emulsifier being one selected from the group consisting of SPAN® 80 (sorbitan monooleate), EMCOLPL™-50 (1,2-propanediol monolaurate), and ARLACEL® 60 (sorbitan stearate), and a second emulsifier being one selected from the group consisting of PEREGAL® O (i.e., PPG O, fatty alcohol polyoxyethylene ether), TWEEN® 20 (polyoxyethylene (20) sorbitan monolaurate), and sodium dodecyl sulfate (SDS).

Preferably, the dispersant is selected from the group consisting of polyethylene glycol (PEG), polypropylene glycol (PPG), and polyvinyl alcohol (PVA).

Preferably, the silane composite emulsion includes the following components by mass percentage:
the tetraethoxysilane 15% to 50%;
the isobutyltriethoxysilane 10% to 60%;
the butyl acrylate 10% to 60%;
the magnesium oxide 10% to 20%;
the first emulsifier 0.1% to 2%;
the second emulsifier 0.1% to 3%;
the dispersant 0.1% to 0.5%; and
water as a balance.

Preferably, a preparation method of the silane composite emulsion includes the following steps:
(1) conducting first mixing on the first emulsifier, the isobutyltriethoxysilane, the butyl acrylate, and the dispersant to obtain an oil phase;
(2) conducting second mixing on the second emulsifier, the magnesium oxide, and water to obtain an aqueous phase; and
(3) adding the oil phase and the tetraethoxysilane to the aqueous phase to conduct emulsification to obtain the silane composite emulsion; where
step (1) and step (2) are conducted in any order.

Preferably, the first mixing is conducted at 1,000 r/min to 2,200 r/min and 30° C. to 65° C.; and the second mixing is conducted at 1,000 r/min to 2,200 r/min and 30° C. to 65° C.

Preferably, the emulsification is conducted at 30° C. to 80° C. for 4 h to 8 h by stirring at 1,300 r/min to 2,500 r/min.

Preferably, a Use Method Includes the Following Steps:
mixing the silane composite emulsion with the cement-based material and water to obtain
a cement mortar; and
conducting maintenance on the cement mortar.

Preferably, the silane composite emulsion has a mass of 0.1% to 3% of a mass of the cement-based material, and has a solid content of 70% to 85%.

Preferably, the silane composite emulsion has the mass of 2% of the mass of the cement-based material.

Preferably, the cement mortar has a water-cement ratio of 0.3 to 0.6 and a cement-sand ratio of 1:3.

Preferably, the maintenance is conducted at 15° C. to 25° C. with a relative humidity of greater than or equal to 50%.

The present disclosure further provides a cement-based material using a silane composite emulsion as an anti-cracking enhancer.

The present disclosure further provides a silane composite emulsion, including tetraethoxysilane, isobutyltriethoxysilane, butyl acrylate, magnesium oxide, an emulsifier, a dispersant, and water.

Preferably, the emulsifier includes a first emulsifier being one selected from the group consisting of SPAN® 80, EMCOLPL™-50, and ARLACEL® 60, and a second emulsifier being one selected from the group consisting of PPG O, TWEEN® 20, and SDS.

Preferably, the dispersant is selected from the group consisting of PEG, PPG, and PVA.

Preferably, the silane composite emulsion includes the following components by mass percentage:
the tetraethoxysilane 15% to 50%;
the isobutyltriethoxysilane 10% to 60%;
the butyl acrylate 10% to 60%;
the magnesium oxide 10% to 20%;
the first emulsifier 0.1% to 2%;
the second emulsifier 0.1% to 3%;
the dispersant 0.1% to 0.5%; and
water as a balance.

The present disclosure provides use of a silane composite emulsion as an anti-cracking enhancer in a cement-based material. In the present disclosure, the isobutyltriethoxysilane is hydrolyzed to form hydroxyl groups, which are hydrogen-bonded with water on a surface of the mortar, and then dehydrated and condensed to form a layered hydrophobic structure, slowing down a water loss inside the mortar of a cement-based material and avoiding cracking caused by drying shrinkage. The butyl acrylate can be dehydrated in the cement-based material to form polymer fibers in the form of a spatial network, which are filled in pores of a cement slurry and play a role of the fibers, thereby limiting the shrinkage of the mortar. The tetraethoxysilane can undergo hydrolysis at a room temperature to generate nano-silica (CNS) with a large number of hydroxyl groups on a surface, which has an excellent activity and undergoes secondary hydration with calcium hydroxide (CH) in the cement to form a secondary hydration product C—S—H gel, filling most of voids to make a structure of the cement hydration product denser, so as to increase a strength of the mortar. In addition, a large number of siloxy alcohol groups and hydroxyl groups generated by the hydrolysis of the tetraethoxysilane can undergo dealcoholization or dehydration with the silane composite emulsion to form Si—O—Si long chains; accordingly, Si—OH on a surface of silicon oxide is partially or completely substituted by alkyl groups to make the mortar surface dense and form a hydrophobic layer, thereby inhibiting cracking caused by the drying shrinkage. The magnesium oxide has a micro-expansion effect inside the cement-based material to well inhibit the cracking caused by other shrinkages. The results of examples show that when the silane composite emulsion has a content of 2 wt %, compared with a blank group, the mortar after maintenance of 28 d has a flexural strength and a compressive strength that are increased by 12% and 5%, respectively.

DETAILED DESCRIPTION OF THE EMBODIMENTS

Figure 1:
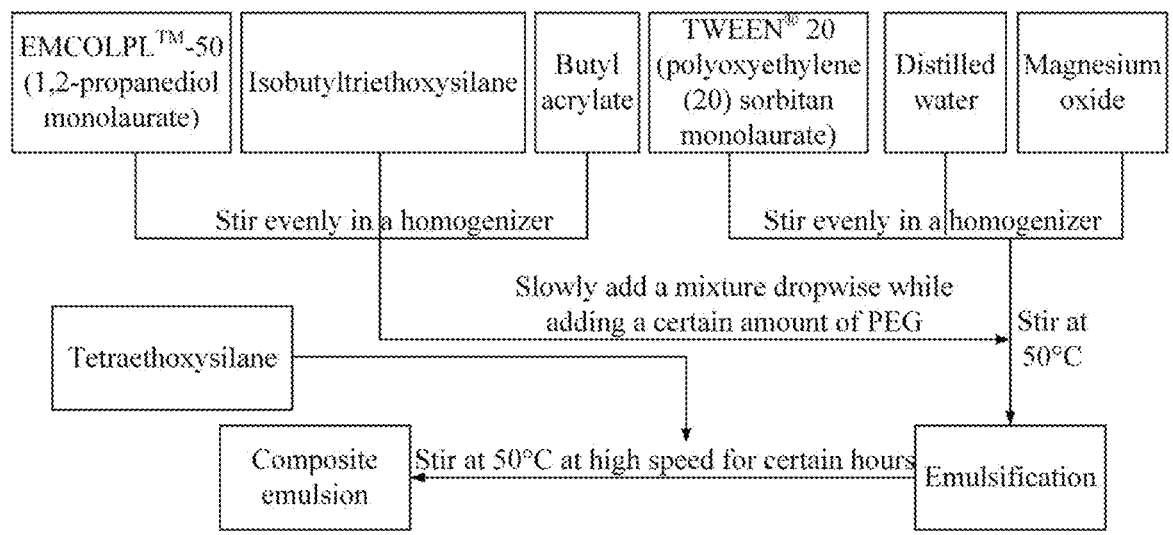
FIG. 1 shows a flow chart of a preparation method of a silane composite emulsion.

The present disclosure provides use of a silane composite emulsion as an anti-cracking enhancer in a cement-based material, where the silane composite emulsion includes tetraethoxysilane, isobutyltriethoxysilane, butyl acrylate, magnesium oxide, an emulsifier, a dispersant, and water.

In the present disclosure, there is no special requirement for the cement-based material, and cement-based materials well-known to those skilled in the art can be used, such as a concrete.

In the present disclosure, the emulsifier includes preferably a first emulsifier being one selected from the group consisting of preferably SPAN® 80, EMCOLPL™-50, and ARLACEL® 83, and a second emulsifier being one selected from the group consisting of preferably PPG O, TWEEN® 20, and SDS.

In the present disclosure, the dispersant is selected from the group consisting of preferably PEG, PPG, and PVA.

In the present disclosure, the silane composite emulsion includes preferably the following components by mass percentage:
the tetraethoxysilane 15% to 50%;
the isobutyltriethoxysilane 10% to 60%;
the butyl acrylate 10% to 60%;
the magnesium oxide 10% to 20%;
the first emulsifier 0.1% to 2%;
the second emulsifier 0.1% to 3%;
the dispersant 0.1% to 0.5%; and
water as a balance.

Unless otherwise specified, the above materials are commercially-available products conventional in the art.

In terms of mass percentage, the silane composite emulsion includes preferably 15% to 50% of tetraethoxysilane. As a specific example, the tetraethoxysilane is purchased from Shanghai A & B Chemical Reagent Co., Ltd.

In terms of mass percentage, the silane composite emulsion includes preferably 10% to 60% of isobutyltriethoxysilane. As a specific example, the isobutyltriethoxysilane is purchased from Quanzhou SICONG New Material Development Co., Ltd.

In terms of mass percentage, the silane composite emulsion includes preferably 10% to 60% of butyl acrylate. As a specific example, the butyl acrylate is purchased from Jinan Huifengda Chemical Co., Ltd.

In terms of mass percentage, the silane composite emulsion includes preferably 10% to 20%, more preferably 13% to 17% of magnesium oxide. As a specific example, the magnesium oxide is purchased from Tianjin Bodi Chemical Co., Ltd.

In terms of mass percentage, the silane composite emulsion includes preferably 0.1% to 2%, more preferably 0.5% to 1.5% of a first emulsifier. As a specific example, the EMCOLPL™-50 is purchased from Sinopharm Chemical Reagent Co., Ltd.

In terms of mass percentage, the silane composite emulsion includes preferably 0.1% to 3%, more preferably 0.5% to 2% of a second emulsifier. As a specific example, the TWEEN® 20 is purchased from Sinopharm Chemical Reagent Co., Ltd.

In terms of mass percentage, the silane composite emulsion includes preferably 0.1% to 0.5%, more preferably 0.2% to 0.4% of a dispersant. As a specific example, the PEG has a chemical formula of $HO(C_2H_4O)_nH$, and is purchased from Shanghai A & B Chemical Reagent Co., Ltd.

In terms of mass percentage, the silane composite emulsion further includes water as a balance.

In the present disclosure, a preparation method of the silane composite emulsion includes preferably the following steps:
(1) conducting first mixing on the first emulsifier, the isobutyltriethoxysilane, the butyl acrylate, and the dispersant to obtain an oil phase;
(2) conducting second mixing on the second emulsifier, the magnesium oxide, and water to obtain an aqueous phase; and
(3) adding the oil phase and the tetraethoxysilane to the aqueous phase to conduct emulsification to obtain the silane composite emulsion; where
step (1) and step (2) are conducted in any order.

In the present disclosure, the first mixing is conducted on the first emulsifier, the isobutyltriethoxysilane, the butyl acrylate, and the dispersant to obtain the oil phase. The first mixing is conducted preferably using a homogenizer at preferably 1,000 r/min to 2,200 r/min, more preferably 1,500 r/min to 2,000 r/min and preferably 30° C. to 65° C., more preferably 40° C. to 55° C. There is no special requirement for a time of the first mixing, as long as the oil phase can be mixed uniformly.

In the present disclosure, the second mixing is conducted on the second emulsifier, the magnesium oxide, and water to obtain the aqueous phase. The second mixing is conducted preferably using a homogenizer at preferably 1,000 r/min to 2,200 r/min, more preferably 1,500 r/min to 2,000 r/min and preferably 30° C. to 65° C., more preferably 40° C. to 55° C. There is no special requirement for a time of the second mixing, as long as the aqueous phase can be mixed uniformly.

In the present disclosure, the oil phase and the tetraethoxysilane are added to the aqueous phase to conduct emulsification to obtain the silane composite emulsion. Preferably, the oil phase is added and then stirred for 0.5 h to 2 h, and then tetraethoxysilane is added. The oil phase is preferably added dropwise at preferably 1 drops/min to 2 drops/min.

In the present disclosure, the emulsification is conducted preferably with stirring. The emulsification is conducted at preferably 30° C. to 80° C., more preferably 45° C. to 60° C. for preferably 4 h to 8 h, more preferably 5 h to 6 h. The emulsification is conducted at preferably 1,300 r/min to 2,500 r/min, more preferably 1,500 r/min to 2,000 r/min. The emulsification is started after the tetraethoxysilane is added dropwise.

In the present disclosure, a use method of the silane composite emulsion as an anti-cracking enhancer in a cement-based material includes preferably the following steps:
mixing the silane composite emulsion with the cement-based material and water to obtain a cement mortar; and
conducting maintenance on the cement mortar.

In the present disclosure, the silane composite emulsion has a mass of preferably 0.1% to 3%, more preferably 1% to 2% of a mass of the cement-based material, and has a solid content of preferably 70% to 85%, more preferably 75% to 80%.

In the present disclosure, there is no special requirement for a mixing method, and mixing methods well known to those skilled in the art can be used. The cement mortar has a water-cement ratio of preferably 0.6 and a cement-sand ratio of preferably 1:3.

In the present disclosure, the maintenance is conducted at preferably 15° C. to 25° C., more preferably 20° C. with a relative humidity of greater than or equal to 50%, more preferably 55% to 60%.

The present disclosure further provides a cement-based material using the silane composite emulsion as an anti-cracking enhancer.

The use of a silane composite emulsion as an anti-cracking enhancer in a cement-based material provided by the present disclosure are described in detail below with reference to the examples, but these examples may not be understood as a limitation to the protection scope of the present disclosure.

Example 1

A Silane Composite Emulsion was Prepared by the Following Raw Materials:

tetraethoxysilane 30%;

isobutyltriethoxysilane 20%;

butyl acrylate 20%;

magnesium oxide 10%;

EMCOLPL™-50 0.5%;

TWEEN® 20 1%;

PEG 0.5%; and water 18%.

a Preparation Method Included the Following Steps:
(1) the EMCOLPL™-50, the isobutyltriethoxysilane, the butyl acrylate, and the dispersant were subjected to first mixing by stirring with a homogenizer at 2,000 r/min and 40° C. to obtain an oil phase;
(2) the TWEEN® 20, the magnesium oxide, and the water were subjected to second mixing by stirring with the homogenizer at 2,000 r/min and 40° C. to obtain an aqueous phase; and
(3) the oil phase was added dropwise to the aqueous phase while stirring at 40° C., an obtained mixture was subjected to emulsification under stirring at 2,500 r/min and 50° C. for 4 h to obtain the silane composite emulsion; where
a flow chart of the preparation method was shown in FIG. 1.

A test cement was P.O 42.5 ordinary Portland cement produced by Qingdao Shanshui Cement Plant; a chemical composition is tested according to "General Portland Cement" (GB175-2007), and specific components were shown in Table 1.

TABLE 1

Cement Chemical Composition

| | Silica | Iron oxide | Alumina | Calcium oxide | Magnesium oxide | Sulphur trioxide | Sodium oxide | Others |
|---|---|---|---|---|---|---|---|---|
| | | | | Chemical composition/% | | | | |
| P.O 42.5 | 23.10 | 3.67 | 7.10 | 57.59 | 2.18 | 2.65 | 0.18 | 3.53 |

The mortar had a water-cement ratio of 0.6 and a cement-sand ratio of 1:3; the silane composite emulsion had a content of 1%, 2%, 3%, and 4% of a cement mass; an amount of water was deducted from water contained in the silane composite emulsion to ensure that the water-cement ratio of the mortar remained unchanged. The specific mixing ratio was shown in Table 2.

TABLE 2

Mortar mix ratio

| SN | Cement/g | Sand/g | Water/g | Silane composite emulsion/g |
|---|---|---|---|---|
| B | 450 | 1350 | 270 | 0 |
| T1 | 450 | 1350 | 269.19 | 4.5 |
| T2 | 450 | 1350 | 268.38 | 9 |
| T3 | 450 | 1350 | 267.57 | 13.5 |
| T4 | 450 | 1350 | 266.76 | 18 |

Performance Testing
(I) Water Loss Experiment

A drying shrinkage test was conducted using a prismatic mortar of 40 mm×40 mm×160 mm. The mortar was placed at a room temperature (20° C.±3° C.) for 1 d, a mold was removed, a probe was pasted immediately after the mold was removed, and the mortar was maintained in a standard maintenance room for 1 d. At an age of 3 d, the mortar was removed from the standard maintenance room, and immediately moved into a constant-temperature and constant-humidity room to measure an initial mass of the mortar. Each mortar length was measured three times, and an average of the three results was taken as a final result. At time intervals of 3 d, 7 d, 14 d, and 28 d, the length and mass of the mortar were tested.

Figure 2:
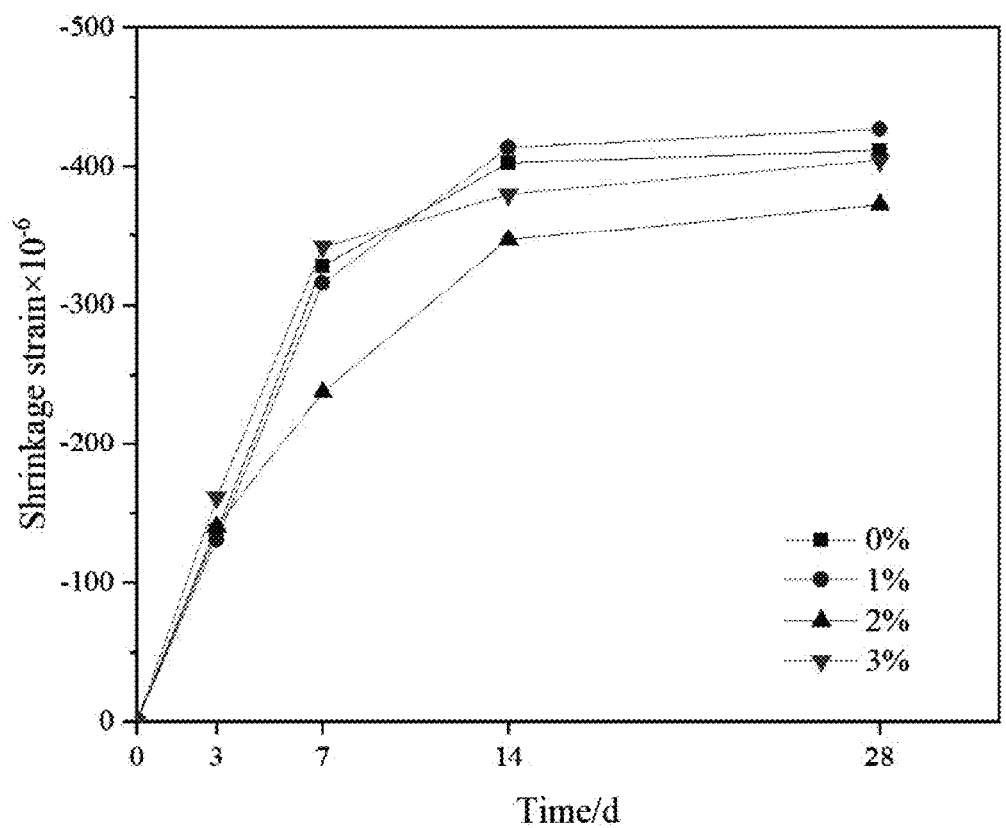
FIG. 2 shows an influence of a content of the silane composite emulsion on drying shrinkage of a mortar.

FIG. 2 showed an influence of a content of the silane composite emulsion on drying shrinkage of the mortar.

It was seen from FIG. 2 that when the silane composite emulsion had a content of 2%, the mortar had the smallest drying shrinkage, and the drying shrinkage of the mortar at 28 days was reduced by 9% compared with the mortar in a blank group.

Figure 3:
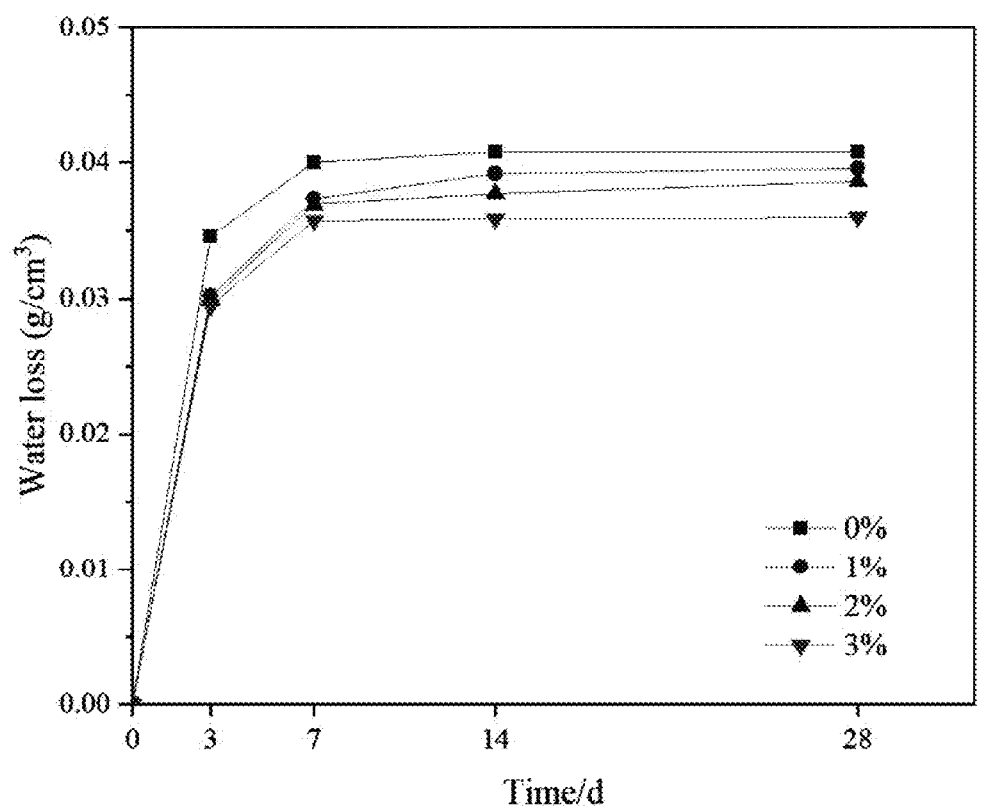
FIG. 3 shows an influence of the content of the silane composite emulsion on water loss of the mortar.

FIG. 3 showed an influence of the content of the silane composite emulsion on water loss of the mortar.

It was seen from FIG. 3 that the water loss of the mortar decreased gradually with an increase of the content of the silane composite emulsion; when the silane composite emulsion had a content of 3%, compared with the mortar in the blank group at the same age, the water loss was reduced by about 12%.

(II) Test of Mechanical Properties

The mechanical properties of the mortar were tested according to "Method of testing cements-Determination of strength (ISO)" (GB/T 17671-1999). Three groups of mortar were prepared, maintained in a constant-temperature and constant-humidity room for 7 d, 14 d, and 28 d, respectively, and then taken out. The flexural strength and compressive strength of each mortar were tested by an automatic pressure testing machine.

Figure 4:
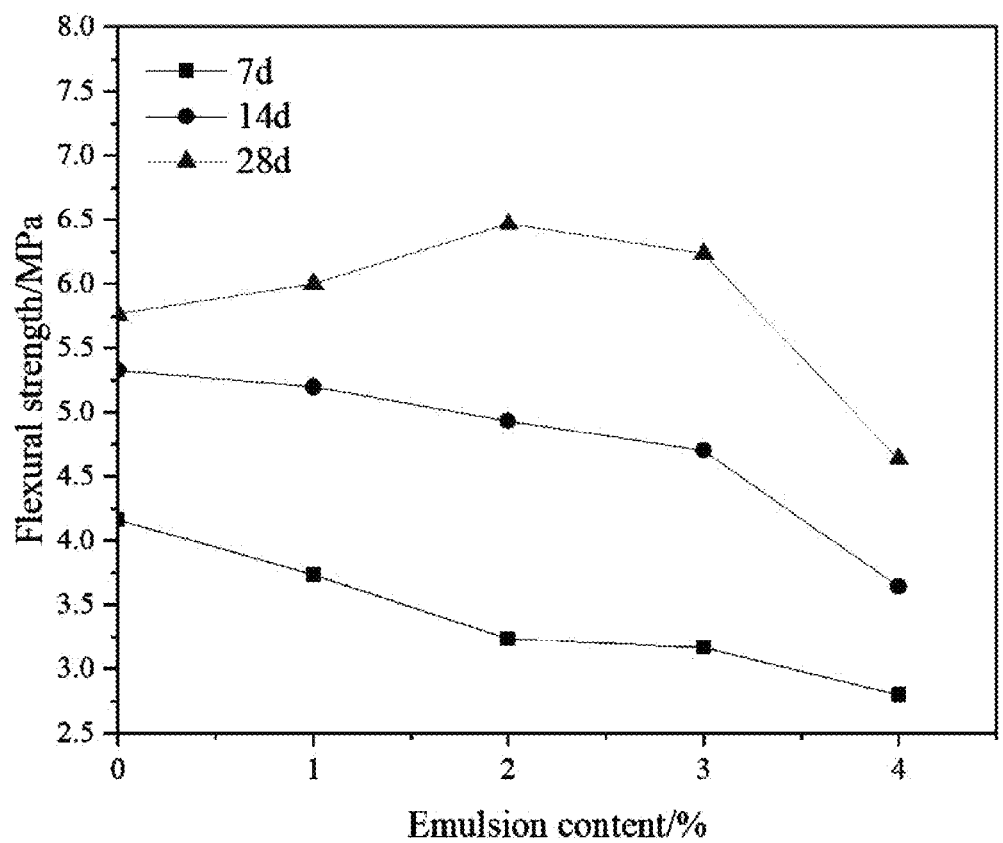
FIG. 4 shows an influence of the silane composite emulsion on a flexural strength of the mortar.
Figure 5:
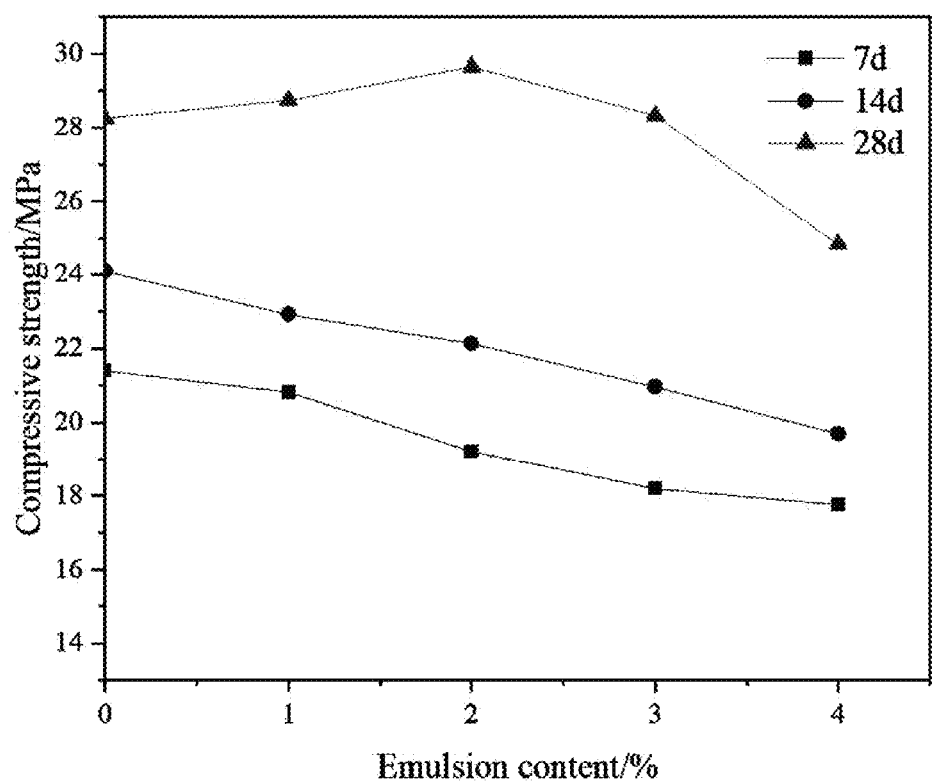
FIG. 5 shows an influence of the silane composite emulsion on a compressive strength of the mortar.

FIG. 4 showed an influence of the silane composite emulsion on the flexural strength of the mortar; and FIG. 5 showed an influence of the silane composite emulsion on a compressive strength of the mortar.

It was seen from FIG. 4 and FIG. 5 that the compressive strength and the flexural strength of the mortar gradually decreased with an increase of the content of the silane composite emulsion at 7 d and 14 d of maintenance. This was because the incorporated TOES/silane composite emulsion was wrapped on a surface of cement particles, hindering cement hydration, such that the mortar had a low early hydration degree, and hydration products were correspondingly reduced, resulting in a decreased mortar strength.

However, with an increase of the maintenance age, a negative influence of the silane composite emulsion gradually decreased on the mortar strength. After maintaining for 28 d, the silane composite emulsion could improve the mortar strength at a low content. At a content of 2%, the strength reached the limit, and the flexural strength and the compressive strength were increased by 12% and 5%, respectively. This was due to the hydrolysis of tetraethoxysilane at room temperature to generate CNS with a large number of hydroxyl groups on a surface; moreover, the CNS had an excellent activity and underwent secondary hydration with CH in the cement to form a secondary hydration product C—S—H gel. Therefore, most of voids were filled, resulting in a denser structure of the cement hydration product, thereby increasing the mortar strength.

(III) Morphological Characterization

Figure 6:
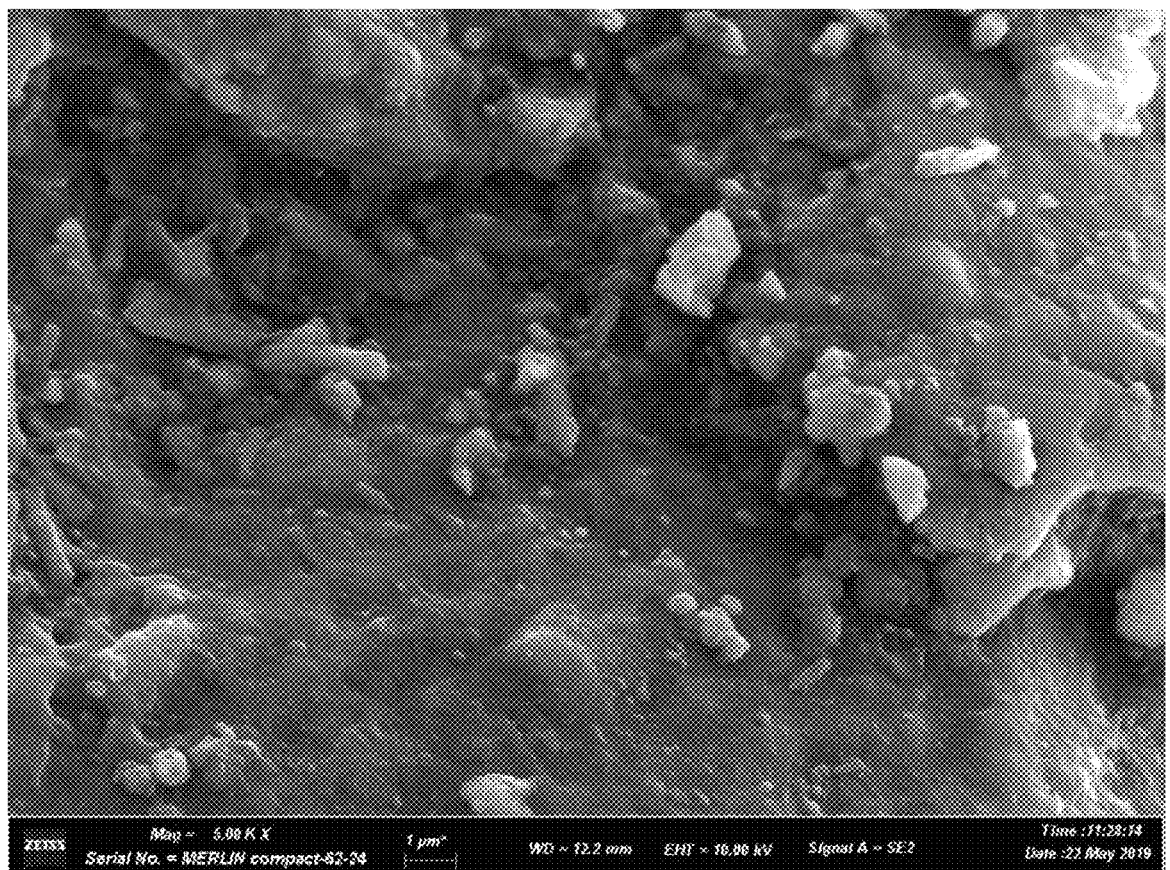
FIG. 6 shows an internal scanning electron microscopy (SEM) image of a mortar of a blank group.
Figure 7:
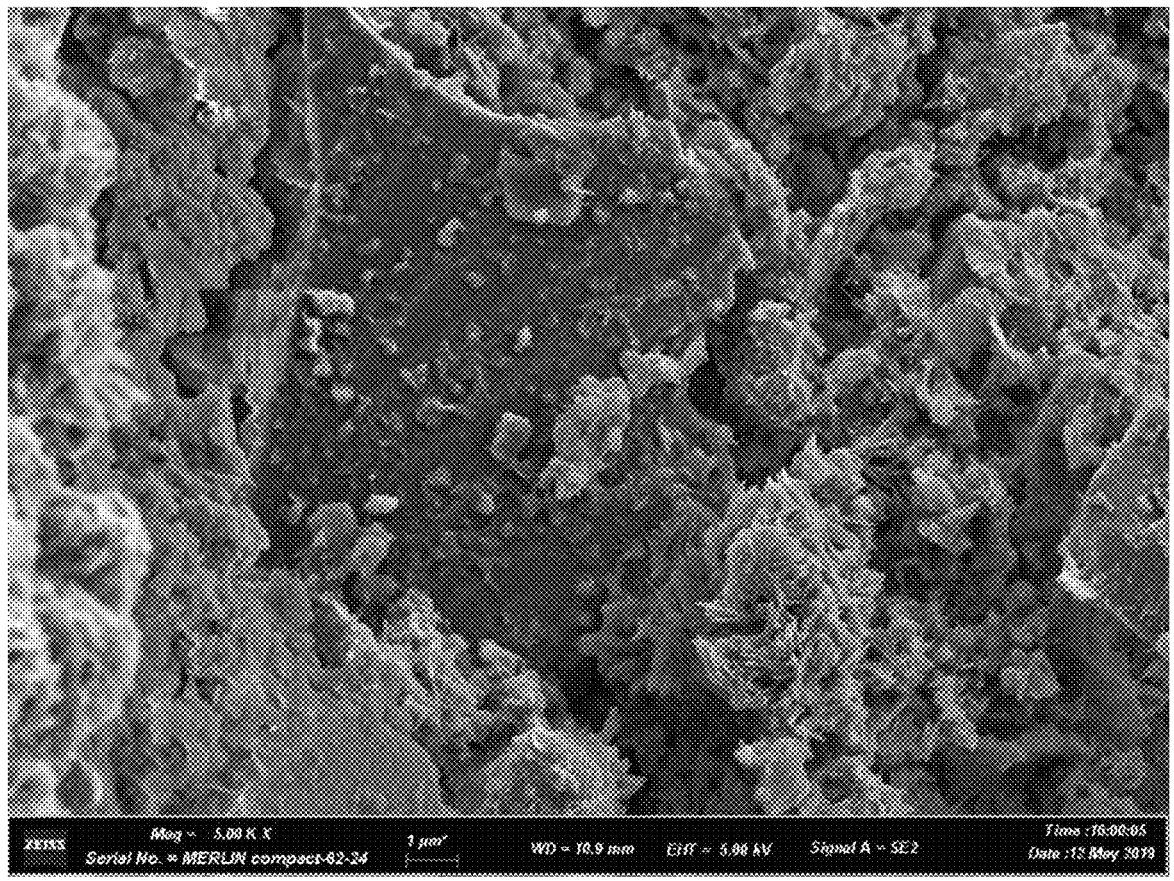
FIG. 7 shows a SEM image of the mortar when the silane composite emulsion has a content of 2 wt %.

On a 28th day of maintenance, samples were tapped inside the mortar, and an internal appearance of the mortar was observed with a thermal field emission scanning electron microscope (Merlin Compact, Zeiss, Germany). FIG. 6 showed a microstructure inside the mortar in the blank group magnified by 5,000 times; and FIG. 7 showed a microstructure inside the mortar magnified by 5,000 times when the silane composite emulsion had a content of 2 wt %.

It was seen from FIG. 6 that the mortar in the blank group had a relatively flat internal appearance, and there were some tiny particles on the surface, which were the appearance of cement hydration products. It was seen from FIG. 7 that after adding the silane composite emulsion, the mortar had an obvious flocculent structure inside.

(IV) Energy Spectrum Analysis

Figure 8A:
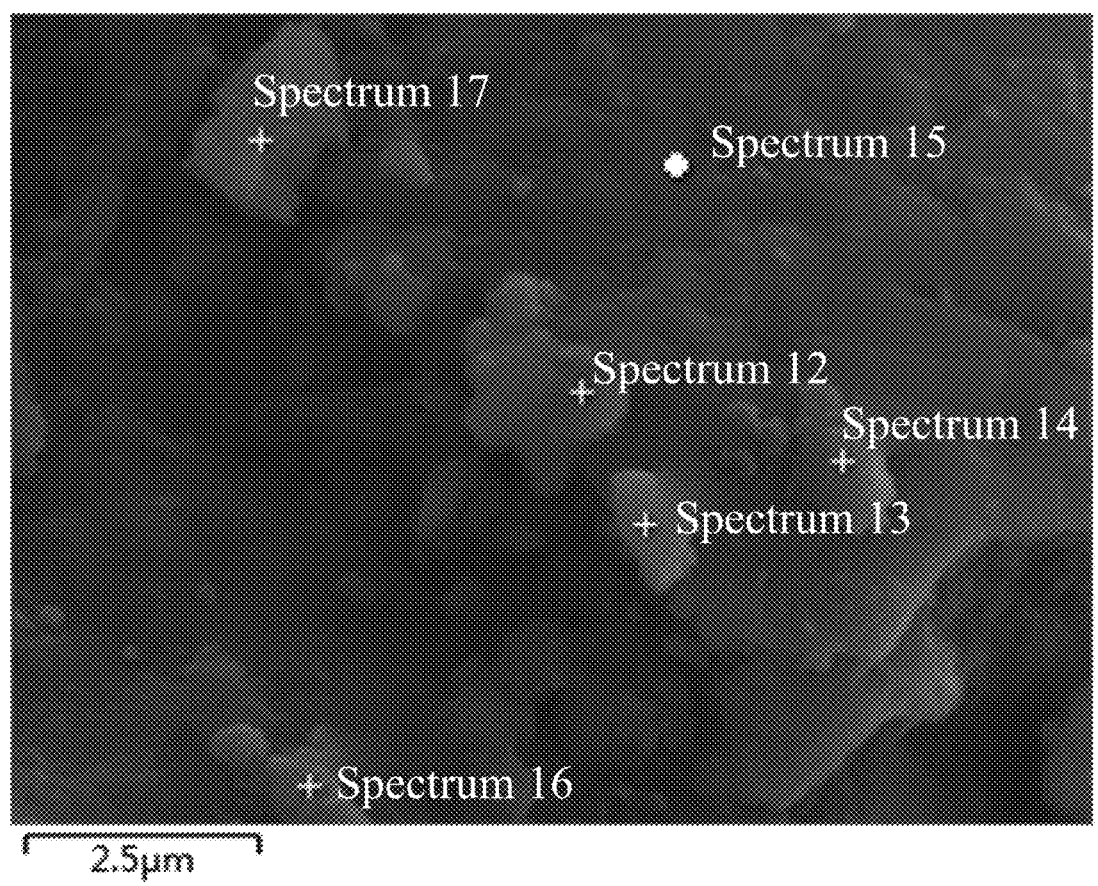
FIG. 8 shows an energy spectrum analysis result of the blank group.
Figure 8B:
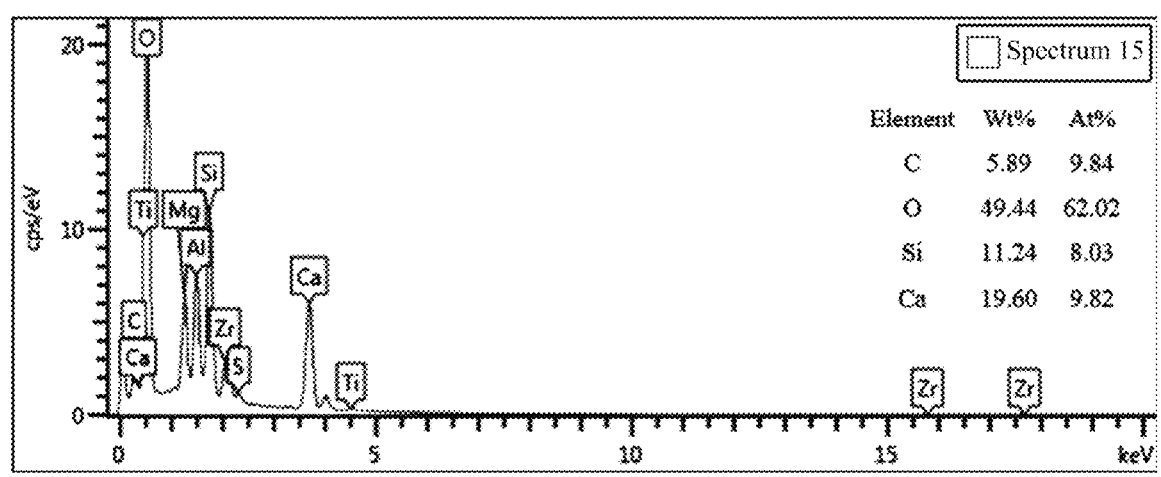
Figure 9A:
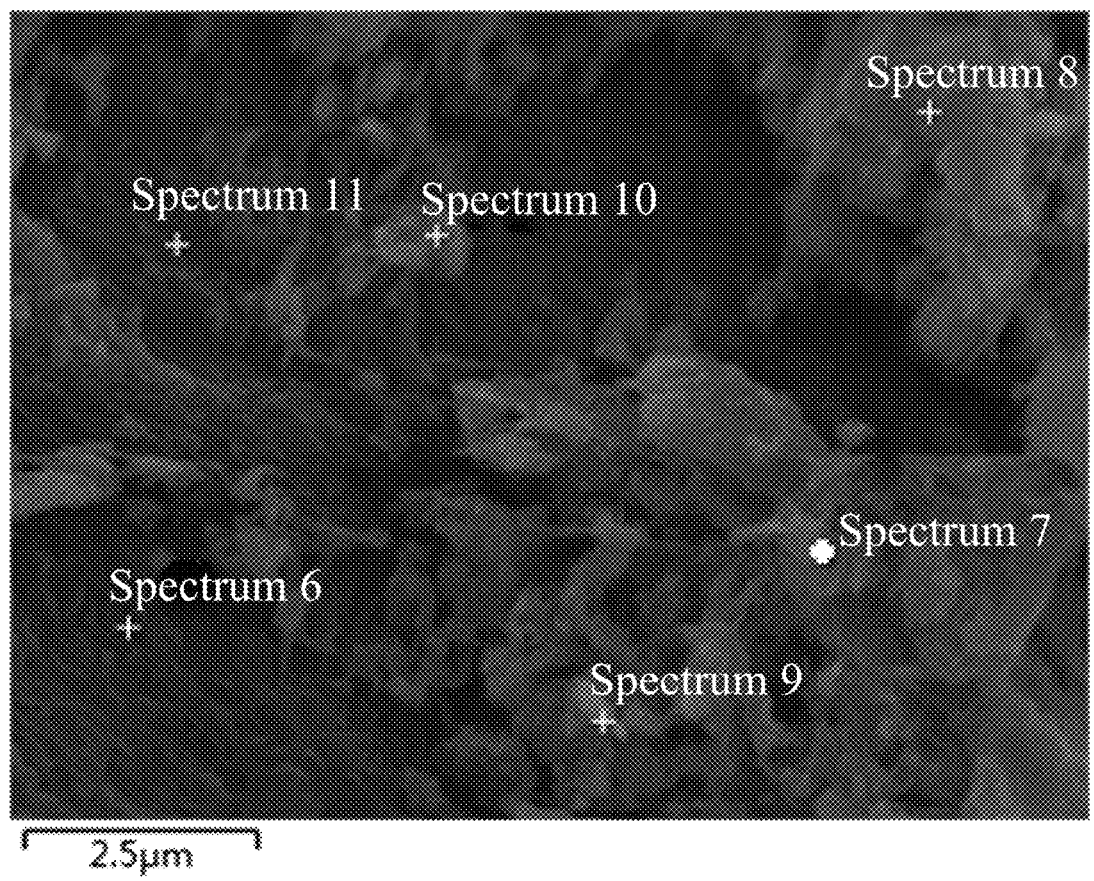
FIG. 9 shows an energy spectrum analysis result of the mortar when the silane composite emulsion has a content of 2 wt %.
Figure 9B:
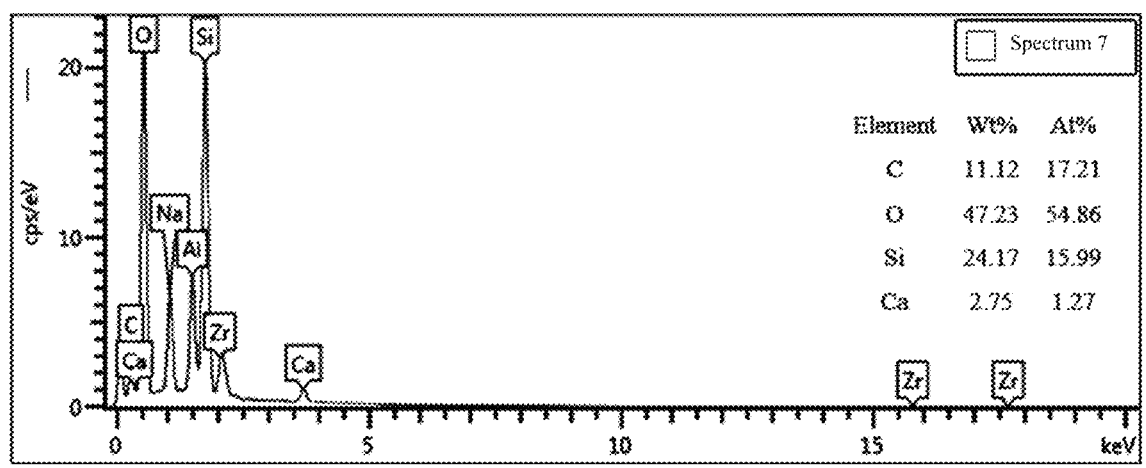

Samples were tapped inside the 28-day-maintained mortar, and then subjected to energy spectrum analysis. FIG. 8 showed an energy spectrum analysis result of the blank group, where FIG. 8A was a schematic diagram of energy spectrum points of the mortar, and FIG. 8B was scanning results of the energy spectrum points of the mortar. FIG. 9 showed an energy spectrum analysis result of the mortar when the silane composite emulsion had a content of 2 wt %, where FIG. 9A was a schematic diagram of energy spectrum points of the mortar, and FIG. 9B was scanning results of the energy spectrum points of the mortar.

Comparing an element content in FIG. 8 and FIG. 9, it was found that contents of Si and C elements in the mortar mixed with the silane composite emulsion each were greatly increased compared with that of the mortar in the blank group. This indicated that the silane composite emulsion was well combined with the mortar, and it proved that a flocculent structure under the SEM was formed by the silane composite emulsion.

(V) Infrared Spectral Analysis

Figure 10:
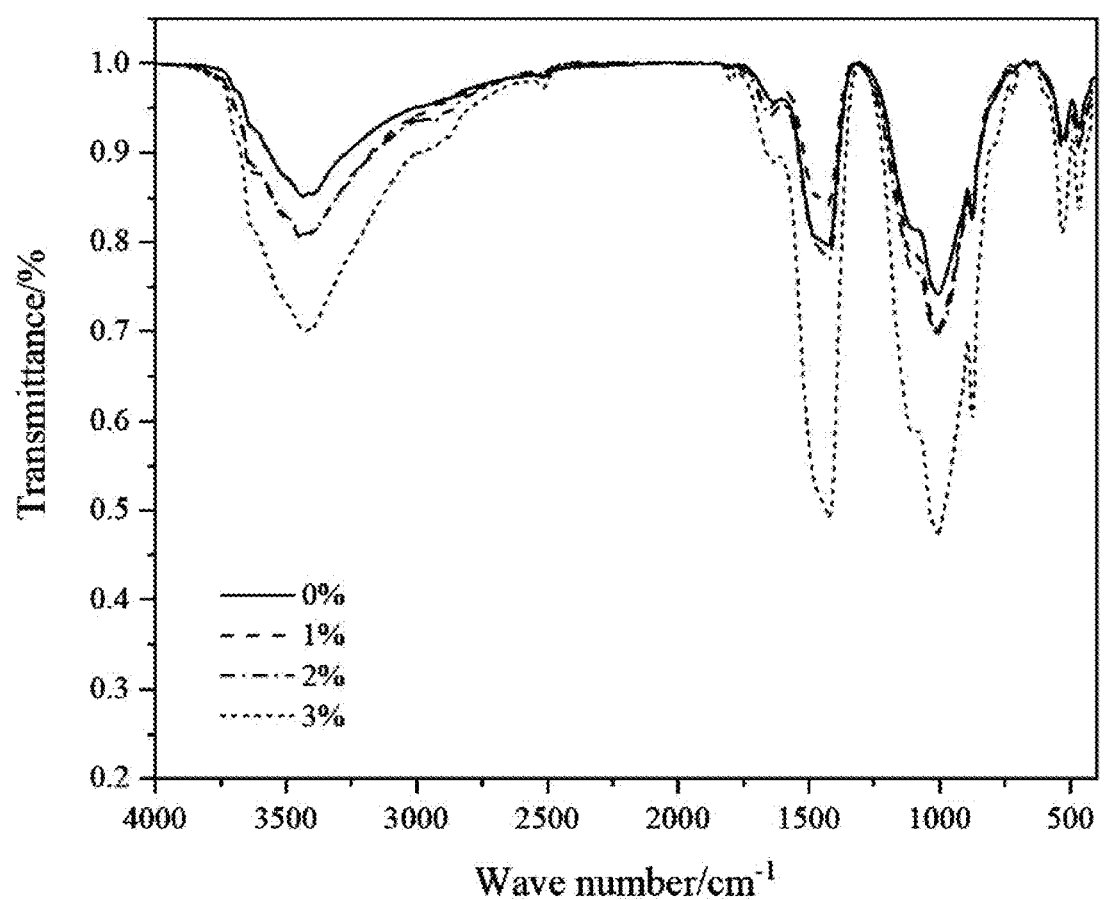
FIG. 10 shows an infrared spectrum of the mortar after the silane composite emulsion is internally mixed.

The mortar mixed with the silane composite emulsion was tested by a Fourier transform infrared spectrometer (Bruker TENSOR II), and results were shown in FIG. 10.

Compared with the mortar in the blank group, the mortar mixed with the silane composite emulsion had obviously different vibration peaks at wave numbers around 1,000 $cm^{-1}$, 1,500 $cm^{-1}$, and 3,500 $cm^{-1}$. The vibration peak around 1,000 $cm^{-1}$ was a characteristic peak generated by Si—O—C vibration absorption, indicating that the silane composite emulsion was well combined with the mortar. It is generally believed that the silane composite emulsion undergoes hydrolysis under the action of air and water, and forms silanol; the newly-generated silanol reacts with hydroxyl groups on the surface of a cement matrix to form a siloxane chain by hydrogen bonding, and is dehydrated and condensed to form a silane hydrophobic layer with Si—O—C characteristic bonds. The vibration peaks at 1,500 $cm^{-1}$ and 3,500 $cm^{-1}$ were caused by the vibration of C═C and —OH bonds, respectively, indicating that the mortar mixed with the silane composite emulsion included hydroxyl and carboxyl groups. The intensity of the three vibration peaks increased with an increase of the content of the silane composite emulsion.

It can be seen from the above tests that, the silane composite emulsion is used as an anti-cracking enhancer of a cement-based material, which can improve a strength of the cement-based material while suppressing cracking of the cement-based material.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A cement-based material product, comprising a silane composite emulsion used as an anti-cracking enhancer;
wherein the silane composite emulsion comprises the following components by mass percentage:
tetraethoxysilane 15% to 50%;
isobutyltriethoxysilane 10% to 60%;
butyl acrylate 10% to 60%;
magnesium oxide 13% to 20%;
a first emulsifier 0.1% to 2%;
a second emulsifier 0.1% to 3%;
a dispersant 0.1% to 0.5%; and
water as a balance, and
wherein the cement-based material product is prepared by a method comprising:
mixing the silane composite emulsion with a cement-based material and water to obtain a cement mortar; and
conducting maintenance on the cement mortar to obtain the cement-based material product.

2. The cement-based material product according to claim 1, wherein the first emulsifier is one selected from the group consisting of sorbitan monooleate, 1,2-propanediol monolaurate, and sorbitan stearate, and the second emulsifier is one selected from the group consisting of a fatty alcohol polyoxyethylene ether, polyoxyethylene (20) sorbitan monolaurate, and sodium dodecyl sulfate (SDS).

3. The cement-based material product according to claim 1, wherein the dispersant is selected from the group consisting of polyethylene glycol (PEG), polypropylene glycol (PPG), and polyvinyl alcohol (PVA).

4. The cement-based material product according to claim 1, wherein a preparation method of the silane composite emulsion comprises the following steps:
(1) conducting first mixing on the first emulsifier, the isobutyltriethoxysilane, the butyl acrylate, and the dispersant to obtain an oil phase;
(2) conducting second mixing on the second emulsifier, the magnesium oxide, and water to obtain an aqueous phase; and
(3) adding the oil phase and the tetraethoxysilane to the aqueous phase to conduct emulsification to obtain the silane composite emulsion; wherein
step (1) and step (2) are conducted in any order.

5. The cement-based material product according to claim 4, wherein the first mixing is conducted at 1,000 r/min to 2,200 r/min and 30° C. to 65° C.; and
the second mixing is conducted at 1,000 r/min to 2,200 r/min and 30° C. to 65° C.

6. The cement-based material product according to claim 4, wherein the emulsification is conducted at a temperature of 30° C. to 80° C. for 4 h to 8 h by stirring at 1,300 r/min to 2,500 r/min.

7. The cement-based material product according to claim 1, wherein the silane composite emulsion has a mass of 0.1% to 3% of a mass of the cement-based material, and has a solid content of 70% to 85%.

8. The cement-based material product according to claim 7, wherein the silane composite emulsion has the mass of 2% of the mass of the cement-based material.

9. The cement-based material product according to claim 1, wherein the cement mortar has a water-cement ratio of 0.3 to 0.6 and a cement-sand ratio of 1:3.

10. The cement-based material product according to claim 1, wherein the maintenance is conducted at a temperature of 15° C. to 25° C. with a relative humidity of greater than or equal to 50%.

11. A silane composite emulsion, comprising:
tetraethoxysilane 15% to 50%;
isobutyltriethoxysilane 10% to 60%;
butyl acrylate 10% to 60%;
magnesium oxide 13% to 20%;
a first emulsifier 0.1% to 2%;
a second emulsifier 0.1% to 3%;
a dispersant 0.1% to 0.5%; and
water as a balance.

12. The silane composite emulsion according to claim 11, wherein the first emulsifier is one selected from the group consisting of sorbitan monooleate, 1,2-propanediol monolaurate, and sorbitan stearate, and the second emulsifier is one selected from the group consisting of a fatty alcohol polyoxyethylene ether, polyoxyethylene (20) sorbitan monolaurate, and SDS.

13. The silane composite emulsion according to claim 11, wherein the dispersant is selected from the group consisting of PEG, PPG, and PVA.

* * * * *